(12) United States Patent
Inaba et al.

(10) Patent No.: US 11,764,660 B2
(45) Date of Patent: Sep. 19, 2023

(54) LINEAR HEAD MODULE

(71) Applicant: SANYO DENKI CO., LTD., Tokyo (JP)

(72) Inventors: Satoshi Inaba, Tokyo (JP); Yuki Onda, Tokyo (JP); Yasushi Misawa, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 0 days.

(21) Appl. No.: 17/837,080

(22) Filed: Jun. 10, 2022

(65) Prior Publication Data
US 2022/0399794 A1 Dec. 15, 2022

(30) Foreign Application Priority Data

Jun. 11, 2021 (JP) .................................. 2021-098056

(51) Int. Cl.
*H02K 41/03* (2006.01)
*H02K 11/22* (2016.01)
*H02K 41/035* (2006.01)

(52) U.S. Cl.
CPC ......... *H02K 41/0356* (2013.01); *H02K 11/22* (2016.01); *H02K 2211/03* (2013.01)

(58) Field of Classification Search
CPC ........ H02K 11/00; H02K 11/22; H02K 41/00; H02K 41/03; H02K 41/031; H02K 41/035; H02K 41/0356; H02K 41/21; H02K 35/00; H02K 35/02
See application file for complete search history.

(56) References Cited

U.S. PATENT DOCUMENTS

| | | | | |
|---|---|---|---|---|
| 5,168,306 | A | * 12/1992 | Morimoto | ........... G03F 7/70358 355/41 |
| 2002/0125316 | A1 | * 9/2002 | Rogers | .................... G06K 13/06 235/440 |
| 2009/0056114 | A1 | 3/2009 | Kanai et al. | |
| 2012/0326537 | A1 | 12/2012 | Tang et al. | |
| 2021/0127535 | A1 | 4/2021 | Furukawa et al. | |
| 2022/0399793 | A1 | * 12/2022 | Inaba | ..................... H02K 11/21 |

FOREIGN PATENT DOCUMENTS

JP 4385406 B2 12/2009

OTHER PUBLICATIONS

Extended European Search Report (EESR) dated Nov. 11, 2022 for European Patent Application No. 22175500.2.

* cited by examiner

*Primary Examiner* — Tran N Nguyen
(74) *Attorney, Agent, or Firm* — Rankin, Hill & Clark LLP

(57) ABSTRACT

A linear head module includes: a plurality of linear motors each including a mover having an output shaft portion; a plurality of detection portions each configured to detect a position of the respective output shaft portion in a direction of a thrust axis; a single circuit board provided with the plurality of detection portions; and a detected portion provided to the respective mover, the detected portion is fixed to the mover via a mounting base, and as viewed in the direction of the thrust axis, a direction in which the mounting base extends from the output shaft portion is different from a direction in which the output shaft portion and the circuit board face each other.

5 Claims, 5 Drawing Sheets

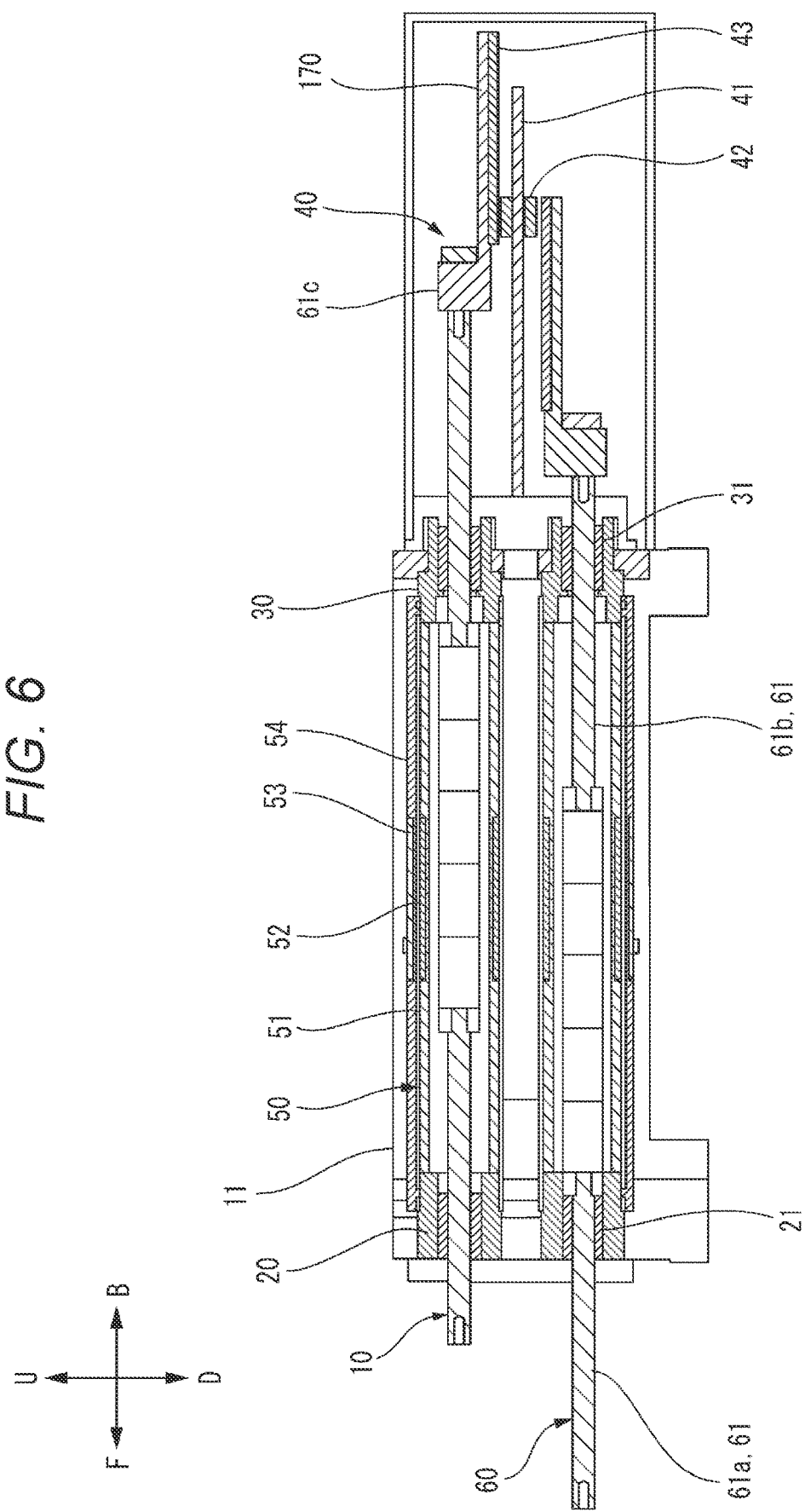

LINEAR HEAD MODULE

CROSS-REFERENCE TO RELATED APPLICATION

This application is based on Japanese Patent Application No. 2021-098056 filed with the Japan Patent Office on Jun. 11, 2021, the entire content of which is hereby incorporated by reference.

BACKGROUND

1. Technical Field

One aspect of the present disclosure relates to a linear head module.

2. Related Art

A linear head module of Japanese Patent No. 4385406 is known.

SUMMARY

A linear head module includes: a plurality of linear motors each including a mover having an output shaft portion; a plurality of detection portions each configured to detect a position of the respective output shaft portion in a direction of a thrust axis; a single circuit board provided with the plurality of detection portions; and a detected portion provided to the respective mover. The detected portion is fixed to the mover via a mounting base, and as viewed in the direction of the thrust axis, a direction in which the mounting base extends from the output shaft portion is different from a direction in which the output shaft portion and the circuit board face each other.

BRIEF DESCRIPTION OF DRAWINGS

FIG. 6 is a cross-sectional view of a linear head module according to a modification of the present disclosure.

DETAILED DESCRIPTION

Figure 1:
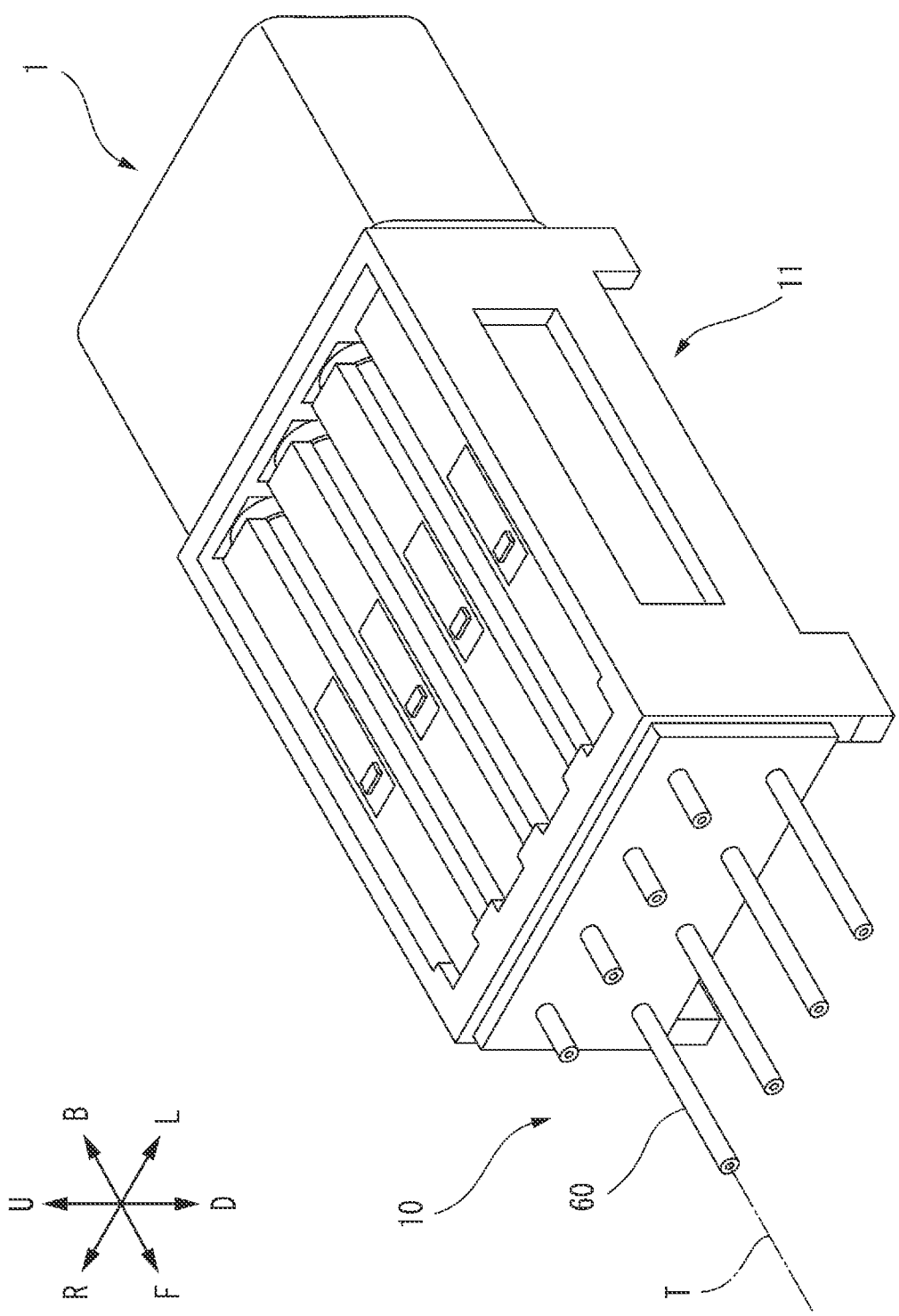
FIG. 1 is a perspective view of a linear head module according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the linear head module described in Japanese Patent No. 4385406, pipes of a plurality of linear motors are integrated into one, sandwiched between a frame and a cover. In the linear head module of Japanese Patent No. 4385406, an output-side portion and a counter-output-side portion of a lower part of the frame are integrated. Hence, it is easy to position an output-side end portion and a counter-output-side end portion of the pipe and to assemble the linear head module. However, the present disclosers have found that there is still room for improvement in the ease of assembly in such a linear head module including a plurality of linear motors.

One object of the present disclosure is to provide a linear head module that is easy to assemble and includes a plurality of linear motors.

A linear head module according to one aspect of the present disclosure (the present linear head module) includes: a plurality of linear motors each including a mover having an output shaft portion; a plurality of detection portions each configured to detect a position of the respective output shaft portion in a direction of a thrust axis; a single circuit board provided with the plurality of detection portions; and a detected portion provided to the respective mover. The detected portion is fixed to the mover via a mounting base, and as viewed in the direction of the thrust axis, a direction in which the mounting base extends from the output shaft portion is different from a direction in which the output shaft portion and the circuit board face each other.

The present linear head module is a linear head module that is easy to assemble and includes a plurality of linear motors.

An embodiment of the present disclosure is described hereinafter with reference to the drawings. Descriptions of members having the same reference numerals as members that have already been described in the detailed description are omitted for the convenience of description. Moreover, the dimensions of each member illustrated in the drawings may be different from actual dimensions thereof for the convenience of description.

FIG. 1 is a perspective view of a linear head module 1 according to the embodiment of the present disclosure. In FIG. 1, a reference sign F indicates front, a reference sign B back, a reference sign U up, a reference sign D down, a reference sign R right, and a reference sign L left.

In the following description, the "left-and-right direction", the "front-and-back direction", and the "up-and-down direction" are mentioned as appropriate for the convenience of description. The "up-and-down direction" is a direction including the "upward direction" and the "downward direction." The "front-and-back direction" is a direction including the "forward direction" and the "backward direction". The "left-and-right direction" is a direction including the "leftward direction" and the "rightward direction". In the following description, the direction of a thrust axis T in the linear head module 1 is referred to as the front-and-back direction.

Figure 2:
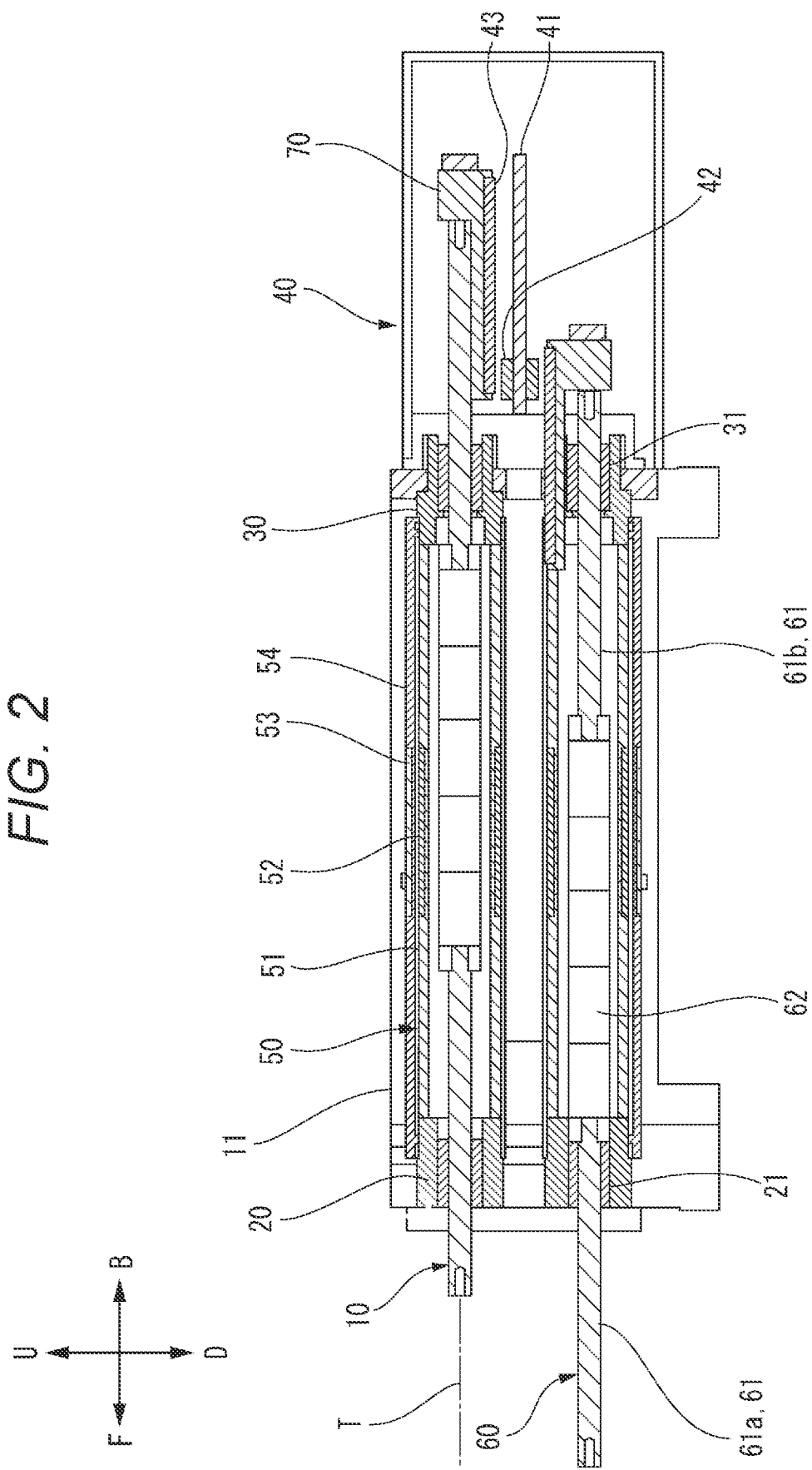
FIG. 2 is a cross-sectional view of the linear head module.

As illustrated in FIG. 1, the linear head module 1 includes the plurality of linear motors 10 each including a mover 60 that moves in the front-and-back direction (the direction of thrust), a housing 11, and a sensor unit 40 (refer to FIG. 2). In the illustrated example, the linear head module 1 includes eight linear motors 10. Four linear motors 10 are arranged in the left-and-right direction in the upper row. Four linear motors 10 are arranged in the left-and-right direction in the lower row.

FIG. 2 is a cross-sectional view of the linear head module 1. FIG. 2 is a diagram of the linear head module 1 as viewed in cross section that extends in the front-and-back direction and in the up-and-down direction. As illustrated in FIG. 2, each of the linear motors 10 includes a stator 50 fixed to the housing 11, and the mover 60 that can move relative to the stator 50 in the front-and-back direction.

The mover 60 includes an output shaft portion 61 extending in the front-and-back direction, and magnets 62. The plurality of magnets 62 is arranged in a line in the front-and-back direction, and is coupled to one another. The output shaft portion 61 is a rod-shaped member extending in the front-and-back direction. The output shaft portion 61 includes a front output shaft portion 61a provided forward of the magnets 62, and a back output shaft portion 61b provided backward of the magnets 62. A front part of the front output shaft portion 61a is connected to a drive target object that is desired to be driven by the linear head module 1.

The stator 50 includes a back yoke 51 and coils 52. In the illustrated example, the stator 50 further includes a drive circuit board 53 that supplies power to the coils 52 and controls the coils 52, and a cover 54 where the drive circuit board 53 is housed. The stator 50 is fixed to the housing 11.

The back yoke 51 is a member mainly including a magnetic material such as iron. In the illustrated example, the back yoke 51 is a cylindrical member extending along the output shaft portion 61. The output shaft portion 61 is housed in the cylindrical back yoke 51 in such a manner as to be movable in the front-and-back direction. Moreover, the plurality of coils 52 is provided in the cylindrical (cylinder type) back yoke 51. The coil 52 is formed by winding an electric wire into a shape of a tube centered around an axis extending in the front-and-back direction. The back yoke 51 causes lines of magnetic flux generated by the coil 52 to converge, and increases magnetic force.

An electric wire extending from a power supply (neither is illustrated) is connected to the drive circuit board 53. The drive circuit board 53 is housed in the plate-shaped cover 54 that is provided on an outer peripheral side of the cylindrical back yoke 51 to house the drive circuit board 53. An electric wire extends from the drive circuit board 53 to the coil 52. The drive circuit board 53 supplies power to the coil 52 via the electric wire. The drive circuit board 53 controls the direction of flow of and the amount of current to be supplied to the coil 52. Therefore, the direction and strength of magnetic lines of force generated around the coil 52 are controlled. Consequently, the drive circuit board 53 controls the direction and speed of the movement of the output shaft portion 61.

As illustrated in FIG. 2, the stator 50 includes a first bearing holder 20. The first bearing holder 20 is attached to the housing 11, and supports an output-side end portion of the back yoke 51 of the stator 50. The first bearing holder 20 is provided to the output-side end portion of the back yoke 51. The first bearing holder 20 includes a first bearing 21 that supports the output shaft portion 61 in such a manner as to be movable in the front-and-back direction.

The stator 50 includes a second bearing holder 30. The second bearing holder 30 is attached to the housing 11, and supports a counter-output-side end portion of the back yoke 51 of the stator 50. The second bearing holder 30 is provided to the counter-output-side end portion of the back yoke 51. The second bearing holder 30 includes a second bearing 31 that supports the output shaft portion 61 in such a manner as to be movable in the front-and-back direction.

In other words, the housing 11 supports the mover 60 via the first bearing 21 and the second bearing 31 in such a manner as to be movable in the direction of the thrust axis T.

The sensor unit 40 detects the position of the output shaft portion 61 in the direction of the thrust axis T. The sensor unit 40 includes a detected portion 43 provided to the respective mover 60, and a plurality of detection portions 42 that are provided to a sensing circuit board 41 and each configured to detect the position of the detected portion 43 in the direction of the thrust axis T. The sensing circuit board 41 is fixed to the housing 11. The detection portions 42 are mounted on the sensing circuit board 41. Hence, the detection portions 42 cannot move relative to the housing 11.

The sensor unit 40 in the embodiment is configured as an optical sensor. The detection portion 42 includes a light emitting portion and a light receiving portion. Light emitted from the light emitting portion is reflected by the detected portion 43. The light receiving portion detects the reflected light. In the detected portion 43, reflective portions with a predetermined width and non-reflective portions (or slits) with a lower reflectivity than the slit reflective portion are alternately arranged along the direction of the thrust axis T. When the output shaft portion 61 moves in the direction of the thrust axis T, the detection portion 42 detects or does not detect the reflected light. Consequently, the output of the detection portion 42 changes. The position of the output shaft portion 61 in the direction of the thrust axis T can be identified on the basis of the change in the output of the detection portion 42.

Figure 3:
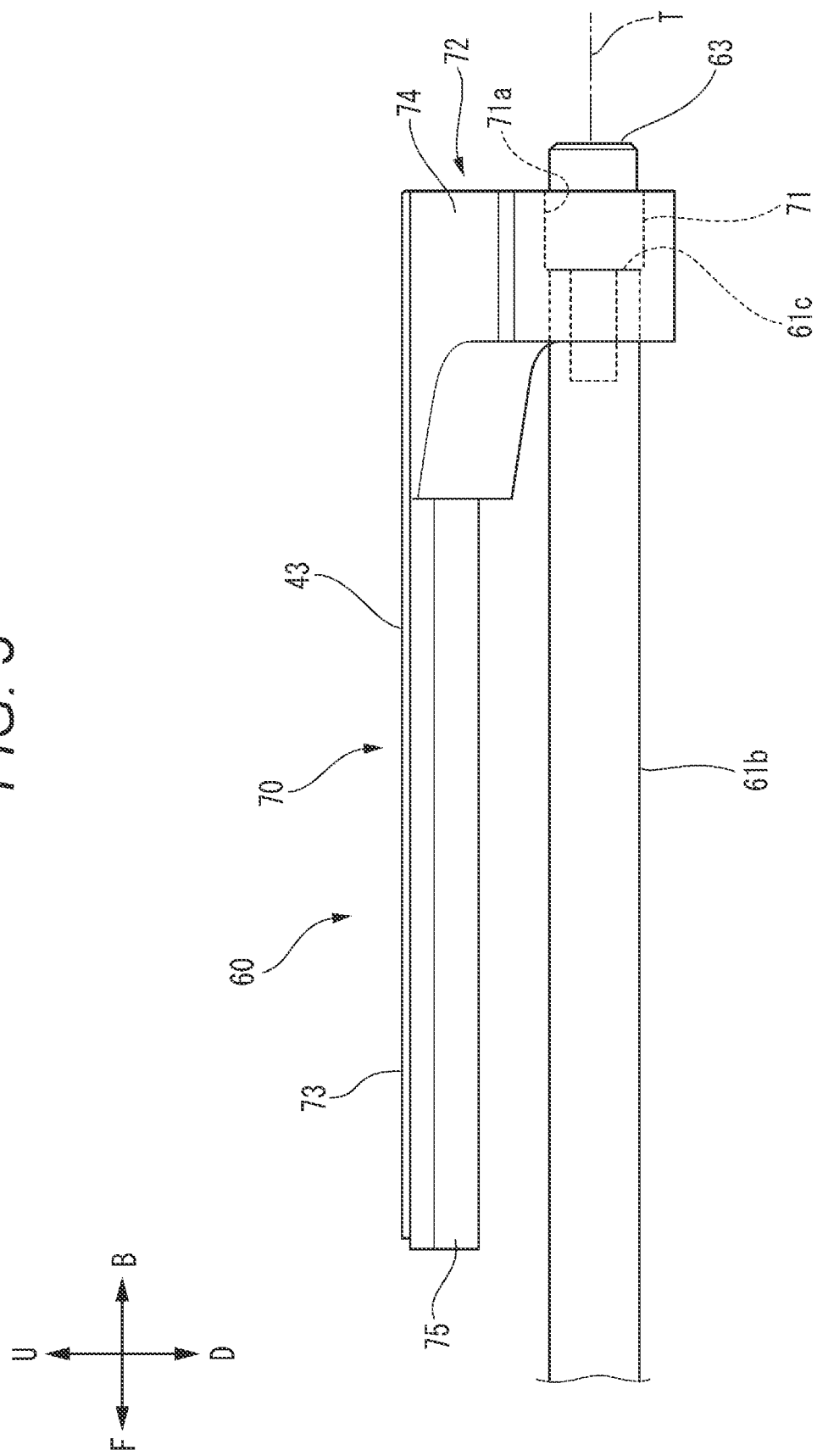
FIG. 3 is an enlarged view illustrating a back output shaft portion of a mover.

FIG. 3 is an enlarged view illustrating the back output shaft portion 61b of the mover 60. As illustrated in FIG. 3, the detected portion 43 is fixed to the mover 60 via a mounting base 70. The detected portion 43 is provided not directly to the back output shaft portion 61b but to the mounting base 70 that extends in a direction crossing the thrust axis T from the back output shaft portion 61b.

In the linear head module 1 where the plurality of linear motors 10 is mounted, the number of components can be reduced if the detection portions 42 are mounted on the common sensing circuit board 41 as mentioned above as compared to if each of the detection portions 42 is mounted on a separate sensing circuit board. However, if the plurality of detection portions 42 is mounted on the common sensing circuit board 41, it is difficult to adjust a clearance D between each detection portion 42 and the detected portion 43. For example, if the sensitivity of the detection portions 42 varies, the outputs of the plurality of detection portions 42 can be adjusted by adjusting the clearance D. Hence, it is convenient that each clearance D can be adjusted.

Figure 4:
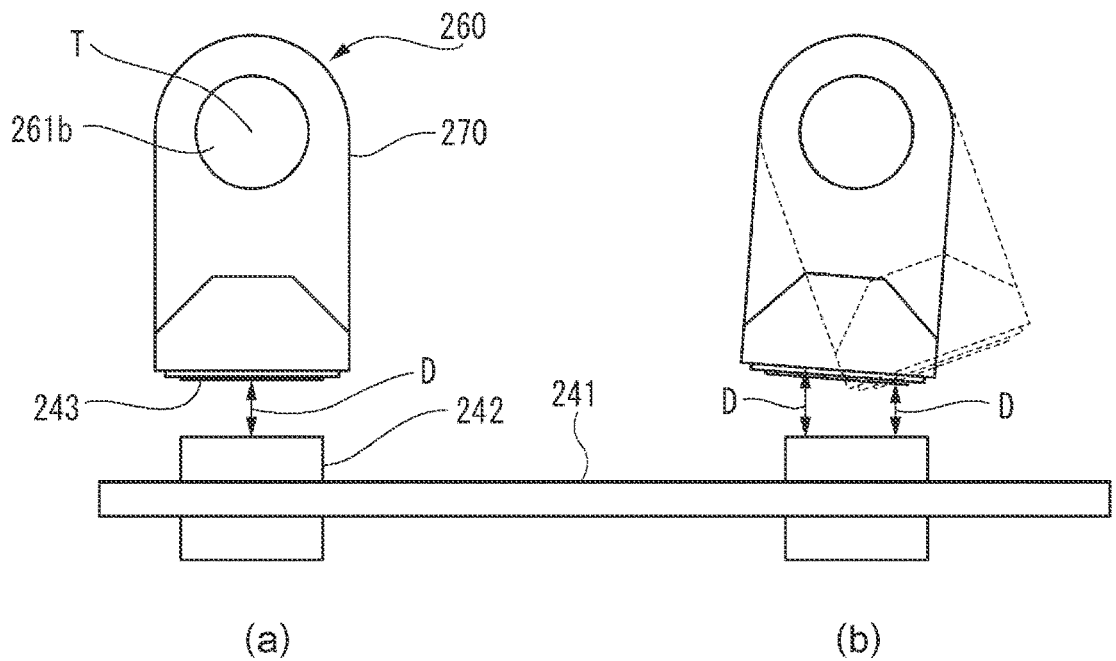
FIG. 4 is a schematic diagram of a linear head module according to a reference example as viewed from a counter-output side of a thrust axis.
Figure 5:
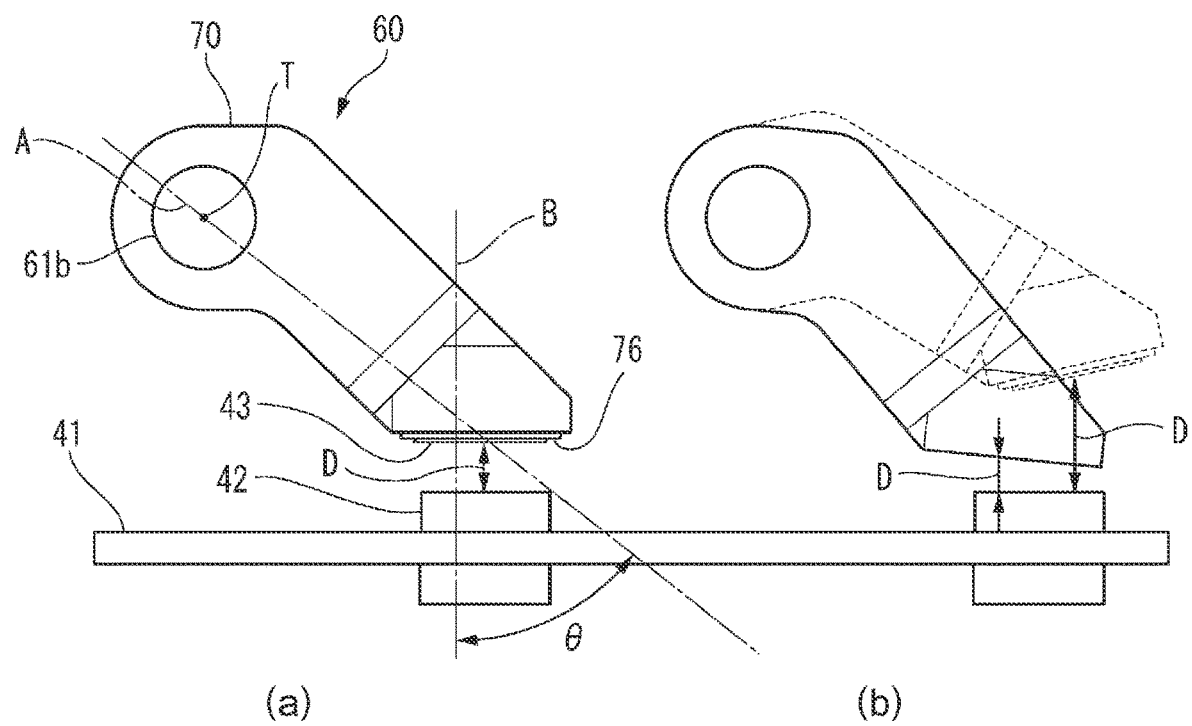
FIG. 5 is a schematic diagram of the linear head module according to the embodiment as viewed from the counter-output side of the thrust axis.

FIG. 4 is a schematic diagram illustrating the positional relationship among a back output shaft portion 261b, a detected portion 243, and a detection portion 242 of a linear head module according to a reference example as viewed from a counter-output side of the thrust axis T. FIG. 5 is a schematic diagram illustrating the positional relationship among the back output shaft portion 61b, the detected portion 43, and the detection portion 42 of the linear head module 1 according to the embodiment as viewed from the counter-output side of the thrust axis T.

As illustrated in (a) in FIG. 4, the detected portion 243 is provided to the back output shaft portion 261b in such a manner that a direction in which the back output shaft portion 261b and a sensing circuit board 241 face each other (the up-and-down direction in (a) in FIG. 4) agrees with a direction in which the detected portion 243 and the detection portion 242 face each other. Accordingly, it is possible to form a mounting base 270 for fixing the detected portion 243 to the back output shaft portion 261b, with a minimum size. Therefore, it is rational. A mover 260 is required to move at high speeds in the thrust direction. Hence, it is required to form the mover 260 itself as lightweight as possible.

In the configuration illustrated in (a) in FIG. 4, it is conceivable to adjust the clearance D (the distance in the up-and-down direction in (b) in FIG. 4) between the detected portion 243 and the detection portion 242 by rotating the back output shaft portion 261b about the thrust axis T as illustrated in (b) in FIG. 4. However, even if the back output shaft portion 261b is rotated about the thrust axis T with such a positional relationship between the detected portion 243 and the detection portion 242, it is difficult to significantly change the clearance D between the detected portion 243 and the detection portion 242. The detection portion 242 has a sensing area that expands upward of the sensing circuit board 241. However, if the back output shaft portion 261b is rotated largely and the detected portion 243 moves largely in the left-and-right direction from immediately above the detection portion 242, it is difficult for the detection portion 242 to sense the detected portion 243.

Hence, the detected portion 43 is fixed to the mover 60 via the mounting base 70 in the linear head module 1 of the embodiment as illustrated in (a) and (b) in FIG. 5. When viewed in the direction of the thrust axis T, a direction in which the mounting base 70 extends from the output shaft portion 61 (an imaginary line A) is different from a direction in which the output shaft portion 61 and the sensing circuit board 41 face each other (an imaginary line B).

In other words, the linear head module 1 according to the embodiment includes the plurality of linear motors 10 each having the mover 60 with the output shaft portion 61, the plurality of detection portions 42 that each detect the position of the output shaft portion 61 in the direction of the thrust axis T, the single sensing circuit board 41 provided with the plurality of detection portions 42, and the detected portion 43 provided to the mover 60. The detected portion 43 is fixed to the mover 60 via the mounting base 70. When viewed in the direction of the thrust axis T, the direction in which the mounting base 70 extends from the output shaft portion 61 is different from the direction in which the output shaft portion 61 and the sensing circuit board 41 face each other.

In this manner, in the linear head module 1 according to the embodiment, the plurality of detection portions 42 is mounted on the single sensing circuit board 41 to enhance the ease of assembly of the linear head module 1. Moreover, as illustrated in (b) in FIG. 5, the clearance D between the detected portion 43 and the detection portion 42 can be changed easily and significantly by rotating the back output shaft portion 61b about the thrust axis T. Moreover, even if the back output shaft portion 61b is rotated largely, the detected portion 43 resists moving largely in the left-and-right direction. As a result, there is plenty of room in the adjustment of the clearance D. Hence, it is also easy to adjust the clearance D between the detected portion 43 and the detection portion 42, which is required due to the adoption of the single sensing circuit board 41.

Alternatively, to put it another way, the detected portion 43 is mounted on a distal end surface 76 of the mounting base 70. When viewed in the direction of the thrust axis T, the imaginary line A extending through the center of the distal end surface 76 from the center of the back output shaft portion 61b (the thrust axis T) crosses the imaginary line B that is a perpendicular to the detection portion 42.

An intersection angle $\theta$ between the imaginary line A and the imaginary line (perpendicular) B is preferably equal to or greater than three degrees. The angle $\theta$ is the intersection angle between the direction in which the mounting base 70 extends from the back output shaft portion 61b and the direction in which the back output shaft portion 61b and the sensing circuit board 41 face each other. If the angle $\theta$ is less than three degrees, it is difficult to efficiently adjust the clearance D between the detected portion 43 and the detection portion 42 by rotating the back output shaft portion 61b as mentioned above.

Moreover, the angle $\theta$ is preferably less than 60 degrees. If the angle $\theta$ is equal to or greater than 60 degrees, the mounting base 70 is likely to interfere with the adjacent back output shaft portion 61b, and in order to avoid such interference, the linear head module 1 is increased in size in an arrangement direction in which the plurality of linear motors 10 is arranged (the left-and-right direction and the up-and-down direction).

Alternatively, to put it still another way, when viewed in the direction of the thrust axis T, the imaginary line extending from the center of the back output shaft portion 61b through the center of the distal end surface 76 where the detected portion 43 is mounted is not orthogonal to the distal end surface 76.

In the linear head module 1 according to the embodiment, as illustrated in FIG. 3, the mover 60 includes the back output shaft portion 61b, the mounting base 70 to which the detected portion 43 is attached, and a metal fastening member 63 that fastens the mounting base 70 to the back output shaft portion 61b. In the illustrated example, the fastening member 63 is a bolt having a threaded portion and a head. The fastening member 63 is screwed in a counter-output-side end surface 61c of the back output shaft portion 61b in the direction of the thrust axis T. The counter-output-side end surface 61c of the back output shaft portion 61b is provided with a screw hole having a threaded inner peripheral surface. The fastening member 63 is screwed in the screw hole.

The mounting base 70 includes a metal fastened portion 71 and a resin mounting portion 72. The fastened portion 71 is sandwiched between the counter-output-side end surface 61c of the back output shaft portion 61b and the head of the fastening member 63. The fastened portion 71 is a cylindrical member, and includes a through-hole 71a penetrating in the direction of the thrust axis T. The fastening member 63 is inserted through the through-hole 71a. The diameter of the through-hole 71a is larger than the diameter of the threaded portion of the fastening member 63, and is smaller than the diameter of the head of the fastening member 63. The counter-output-side end surface of the fastened portion 71 is in contact with the head of the fastening member 63.

The mounting portion 72 includes a mounting surface 73 where the detected portion 43 is attached. The mounting surface 73 is provided at a position off the thrust axis T. The mounting surface 73 extends parallel to the thrust axis T.

In the linear head module 1 according to the embodiment, the mounting portion 72 mainly includes a lightweight resin and has the mounting surface 73 where the detected portion 43 is attached, the mounting surface 73 being provided at the position off the thrust axis T. Hence, even if the mover 60 accelerates or decelerates rapidly, the force of inertia produced on the mover 60 can be limited to a small magnitude.

Furthermore, the metal fastening member 63 is fastened to the counter-output-side end surface 61c of the back output shaft portion 61b. Hence, the mover 60 resists producing a large moment of inertia in a direction away from the thrust axis T. Therefore, an undue force hardly acts on the first bearing 21 and the second bearing 31 that support the output shaft portion 61. In contrast to the embodiment, in the configuration of JP-A-2014-192959, a linear guide that supports a metal mounting base in such a manner as to be movable is provided to a housing to receive the moment of inertia. Such a linear guide does not need to be provided to the linear head module 1 according to the embodiment.

Furthermore, the fastened portion 71 mainly includes metal. Hence, the fastening member 63 can be fastened more tightly to the fastened portion 71 than in a case where the fastened portion 71 includes resin. Hence, even if the output shaft portion 61 accelerates or decelerates rapidly, the mounting base 70 resists deformation. Therefore, it is easy to accurately move the detected portion 43 along a path parallel to the thrust axis T. Hence, it is easy to maintain the detection accuracy of the detection portion 42.

Preferably, the mounting base 70 is formed by insert molding. In insert molding, the metal fastened portion 71 is placed in a cavity first, and then a resin raw material is poured into the cavity.

In the linear head module 1 according to the embodiment, the sensor unit 40 preferably includes the detected portion 43 provided to the respective mover 60, the plurality of detection portions 42 that detect the position of the respective detected portion 43 in the direction of the thrust axis T, and the single sensing circuit board 41 where the plurality of detection portions 42 is mounted.

The plurality of detection portions 42 is provided on the single sensing circuit board 41, which enables a reduction in the number of components.

As illustrated in FIG. 3, the mounting portion 72 includes a coupling portion 74 and a base portion 75 provided with the mounting surface 73. The coupling portion 74 is coupled to the fastened portion 71, and extends in the direction crossing the thrust axis T. The base portion 75 extends from the coupling portion 74 toward the output side.

In the linear head module 1 according to the embodiment, the base portion 75 is provided at a position folded back to the output side from the counter-output-side end surface 61*c* of the back output shaft portion 61*b*. Hence, the dimension of the linear head module 1 in the direction of the thrust axis T can be reduced.

Up to this point the embodiment of the present disclosure has been described. In terms of this, it is needless to say that the technical scope of the present disclosure should not be construed in a limited manner by the description of the embodiment. The embodiment is a mere example. Those skilled in the art understand that various embodiments can be modified in various manners within the technical scope of the present disclosure described in the claims. The technical scope of the present disclosure should be determined on the basis of the scope described in the claims and the scope of equivalents thereof.

For example, in the above-mentioned embodiment, the mounting base 70 has the shape folded back to the output side from the counter-output-side end surface 61*c* of the back output shaft portion 61*b*. In terms of this, as in an example illustrated in FIG. 6, a mounting base 170 may be configured in such a manner as to extend toward the counter-output side from the counter-output-side end surface 61*c* of the back output shaft portion 61*b*.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A linear head module comprising:
    a plurality of linear motors each including a mover having an output shaft portion;
    a plurality of detection portions each configured to detect a position of the respective output shaft portion in a direction of a thrust axis;
    a single circuit board provided with the plurality of detection portions; and
    a detected portion provided to the respective mover, wherein
    the detected portion is fixed to the mover via a mounting base, and
    as viewed in the direction of the thrust axis, a direction in which the mounting base extends from the output shaft portion is different from a direction in which the output shaft portion and the circuit board face each other.

2. The linear head module according to claim 1, wherein the detected portion is mounted on a distal end surface of the mounting base, and
    as viewed in the direction of the thrust axis, an imaginary line extending through a center of the distal end surface from a center of the output shaft portion crosses a perpendicular to the detection portion.

3. The linear head module according to claim 1, wherein the mover includes:
    the mounting base to which the detected portion is attached; and
    a metal fastening member configured to fasten the mounting base to an end surface, on one side in the direction of the thrust axis, of the output shaft portion, and
    the mounting base includes:
    a metal fastened portion sandwiched between the end surface, on the one side in the direction of the thrust axis, of the output shaft portion, and the fastening member; and
    a resin mounting portion having a mounting surface to which the detected portion is attached, the mounting surface being provided at a position off the thrust axis.

4. The linear head module according to claim 3, wherein the resin mounting portion includes a coupling portion coupled to the fastened portion and extending in a direction crossing the thrust axis, and
    the mounting surface is provided to a base portion extending from the coupling portion toward another side in the direction of the thrust axis.

5. The linear head module according to claim 3, wherein the mounting base is formed by insert molding.

* * * * *